June 12, 1928.
R. A. CONNOR
1,673,061
VEHICLE SIGNAL
Filed Nov. 24, 1922    3 Sheets-Sheet 3
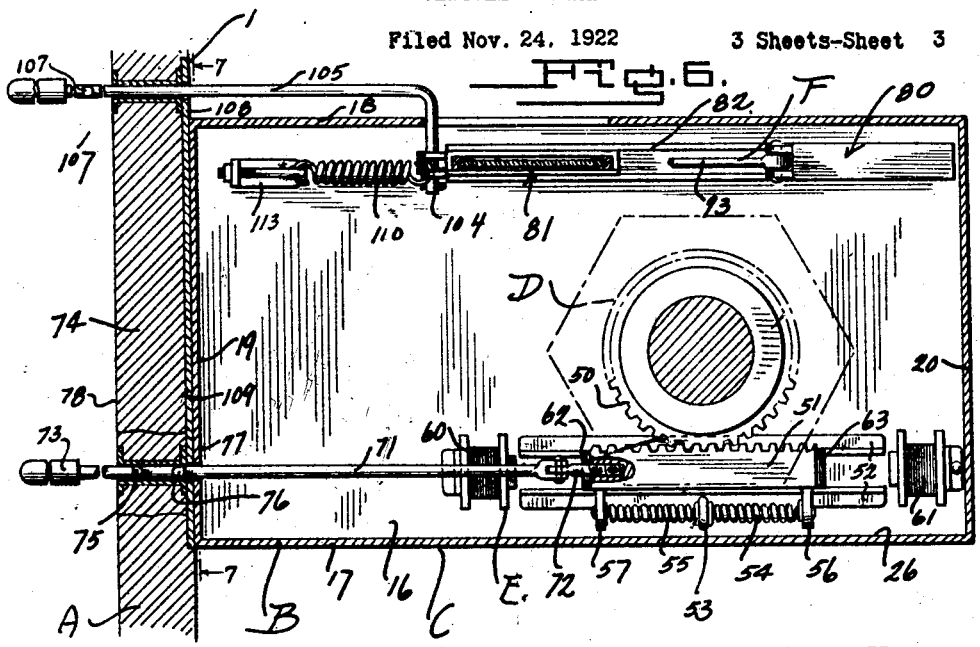
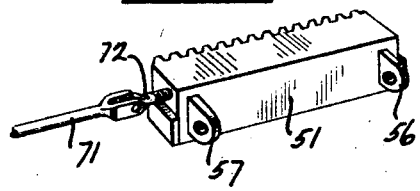
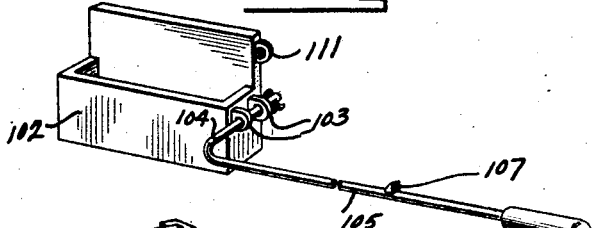
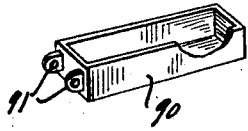
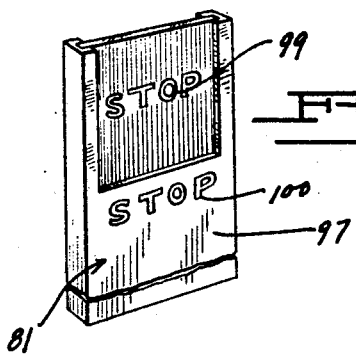
Inventor
Robert A. Connor Patented June 12, 1928.

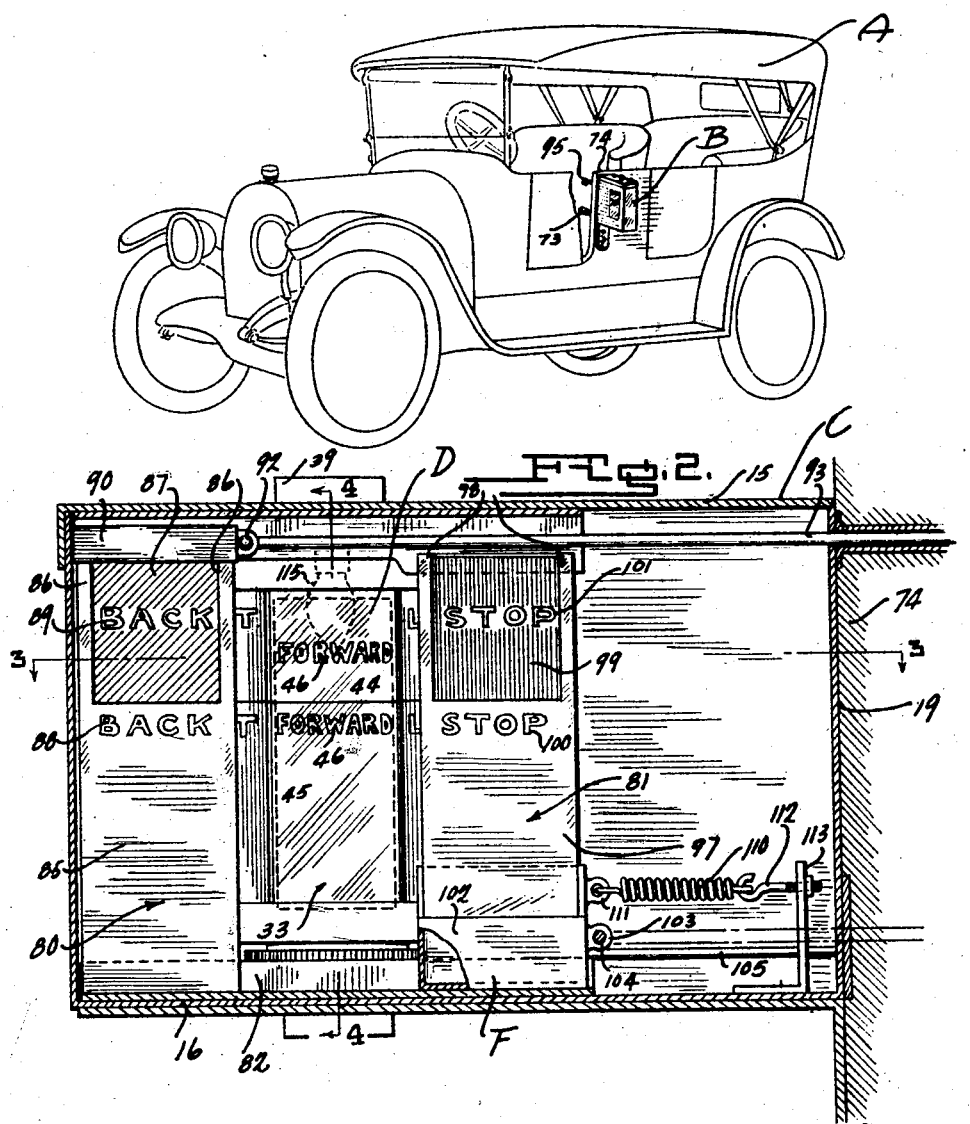

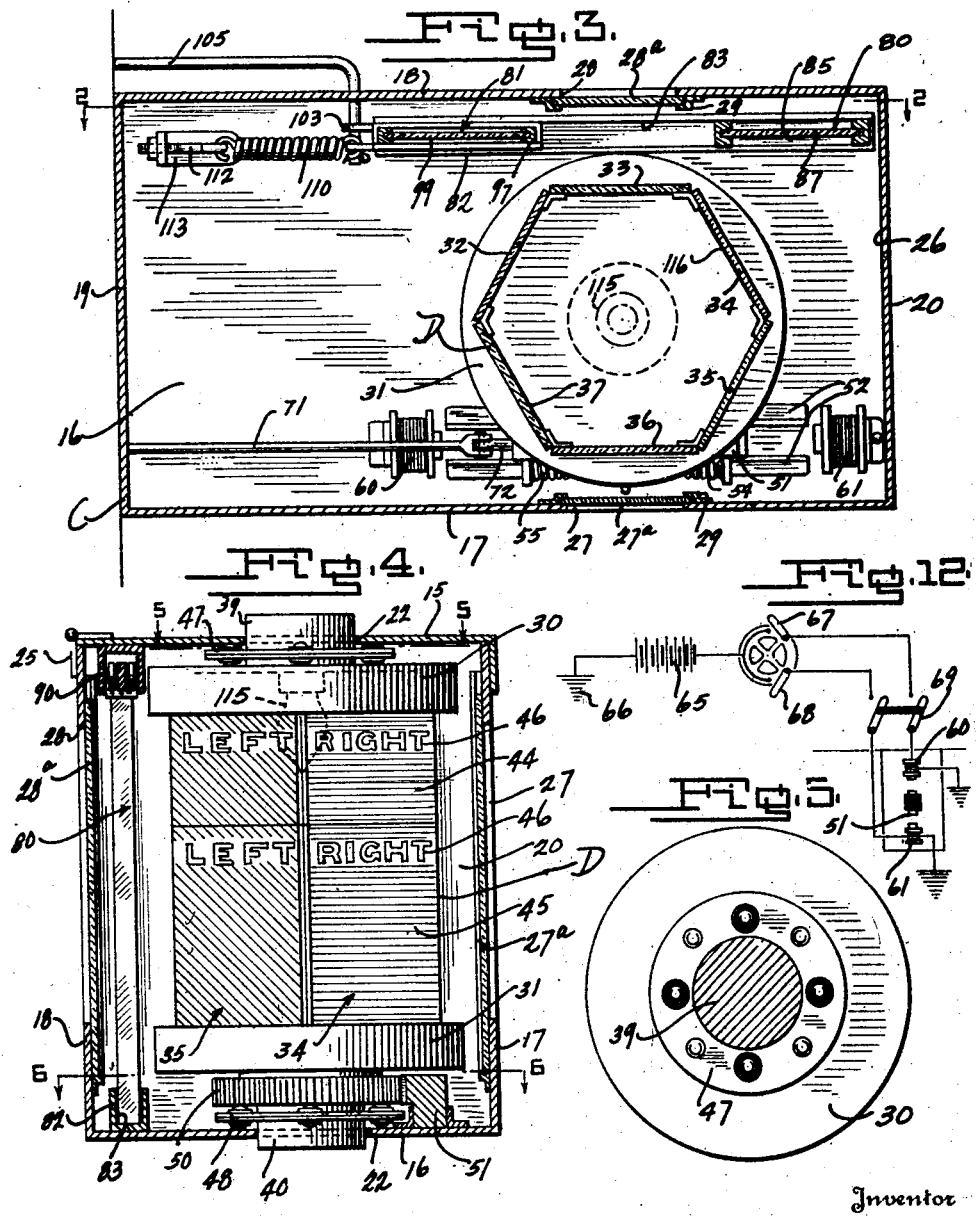

1,673,061

UNITED STATES PATENT OFFICE.

ROBERT A. CONNOR, OF PHILADELPHIA, PENNSYLVANIA.

VEHICLE SIGNAL.

Application filed November 24, 1922. Serial No. 603,053.

This invention relates to improvements in vehicle signals.

The primary object of this invention is the provision of a relatively compact vehicle signal, which may be utilized in connection with automotive vehicles, to indicate a contemplated vehicle movement to traffic both forwardly and rearwardly of the vehicle.

A further and important object of this invention is the provision of a vehicle signal, which may be mounted upon the vehicle body, outwardly thereof, adjacent the driver's compartment, and including novel means for selective operation of the various signal indicia.

A further object of this invention is the provision of a vehicle signal, embodying a novel member upon which is positioned a novel arrangement of indicia pertinent to contemplated vehicle movements.

Other objects and advantages of this invention will be apparent during the course of the following detailed description.

In the accompanying drawings, forming a part of this specification, and wherein similar reference characters designate corresponding parts throughout the several views:

Figure 1 is a perspective view of an automobile, showing the vehicle signal as used in connection therewith.

Figure 2 is a longitudinal vertical sectional view, taken through the vehicle signal, showing its connection with a vehicle body.

Figure 3 is a horizontal sectional view, taken substantially on the line 3—3 of Figure 2.

Figure 4 is a vertical sectional view, taken substantially on the line 4—4 of Figure 2.

Figure 5 is a plan view of a novel type of indicia bearing member.

Figure 6 is a horizontal sectional view, taken substantially on the line 6—6 of Figure 4.

Figure 7 is a vertical sectional view, taken substantially on the line 7—7 of Figure 6.

Figures 8, 9, 10 and 11 are perspective views in detail of parts, cooperatively employed in the vehicle signal.

Figure 12 is a diagrammatic representation of a wiring system, which may be employed in connection with the operation of the vehicle signal.

In the drawings, wherein for the purpose of illustration is shown but the preferred embodiment of this invention, the letter A indicates an automotive vehicle of any approved type, upon which the improved vehicle signal B is mounted for indicating contemplated vehicle movements and actions. The vehicle signal B may include a housing C; indicia bearing mechanism D; operating means E for the arrangement D; and a secondary indicia bearing mechanism F, which may be cooperatively employed with the arrangement D, in informing traffic of contemplated vehicle movements.

Referring to the housing C, the same may be of polygonal formation, including the top and bottom walls 15 and 16 respectively; front and rear walls 17 and 18 respectively; and inner and outer side walls 19 and 20 respectively. The top and bottom walls 15 and 16 respectively, are preferably provided with apertures 22, adapted to receive certain bearing portions of the arrangement D to be subsequently described. The top wall 15, may be in the form of a closure arrangement, hingedly connected as at 25, to the rear wall 18, to permit easy assemblage of the various parts within the compartment 26 of the housing C. The front and rear walls 17 and 18 respectively, are provided with openings 27 and 28, for receiving transparent plates 27$^a$ and 28$^a$ respectively supported as by the flanges 29 carried by the housing C.

The indicia bearing mechanism D, preferably includes a base 30′ and head 31 of disc like formation, which are disposed in facing relation to receive a number of panels. In the present instance, it is preferred that six panels 32, 33, 34, 35, 36 and 37 be used, which may be suitably connected at their marginal portions, longitudinally thereof, to provide a hollow prism shaped body, the ends of which are supported in the facing surfaces of the base and head 30 and 31. The base and head 30 and 31, are respectively provided with the reduced shanks 39 and 40, which are axially aligned. In the mounting of the mechanism D within the compartment 26 of housing C, the shank portions 39 and 40 are to be rotatably disposed in the aligning openings 22 of said housing C, so that it can readily be seen that oppositely disposed plates or panels of the mechanism D, will be exposed for display purposes through the openings 27 and 28 of the housing C.

Referring more particularly to the arrangement of the panels 32 to 37 inclusive, it is preferred that each of these panels include an upper translucent or diaphanous portion 44, and a lower opaque portion 45; these portions respectively bearing the similar indicia 46 thereon pertinent to a contemplated vehicle movement. The arrangement of indicia upon the panels of the mechanism D is as follows:—On panel 32 the word "Left" is disposed, both upon the diaphanous and opaque portions 44 and 45 thereof, the diaphanous portion 44 preferably being tinted green. The panel 33 bears the word "Forward", both on the diaphanous and opaque portions thereof, it being preferred that the diaphanous portion thereof be white or transparent. The panel 34 preferably bears the word "Right" both on the diaphanous and opaque portions thereof, it being preferred that the diaphanous portion thereof be tinted blue. The panels 35 and 37 are respectively of the same arrangement exactly as the panels 32 and 34, and oppositely disposed with respect thereto. The panel 36, which is oppositely disposed to the panel 33, while adapted to bear the word "Forward" both on the opaque and diaphanous portions thereof, is preferably somewhat different than the panel 33, in that the diaphanous portion 44 is tinted yellow, in contra-distinction to the transparency of the diaphanous portion of panel 33.

Like words appear one above another, one on the diaphanous portion and one on the opaque portion so as to enable the word to be easily read either at night or during the day time. While I have referred to certain colors, such as green, associated with the word "Left"; blue associated with the word "Right", etc., these are merely by way of example, since any desired color system may be used whereby certain colors may indicate certain moves or actions about to take place and which may be observed at a distance too great to permit reading the word or words which indicate such contemplated moves or actions.

The assembling of the mechanism D within the housing C is such that opposite panels of the prism arrangement D are exposed through the display openings 27 and 28 in the housing C. Thus, as is illustrated in Figure 3 of the drawings, the signal is disposed so that the words "Forward" on the panel 33 are exposed through the rear display opening 28. In this arrangement, the words "Forward" on the opposite panel 36 are exposed through the front display opening 27. In order to facilitate operation of the mechanism D, it is preferred that the ball bearing or anti-friction devices 47 and 48 be employed in connection with the upper and lower portions 30 and 31, intermediate the cover 15 and bottom wall 16 of the housing C, substantially as is illustrated in Figure 4 of the drawings.

Referring to the means E for operating the indicia bearing mechanism D, it is preferred that a toothed gear wheel 50 be mounted upon the reduced shank 40 of the base 30, the teeth of which are adapted for intermeshing relation with the teeth of a rack 51; the latter being slidably mounted upon the inside of the housing floor 16, as by the guides 52. A lug 53 preferably extends from the casing floor 16, rigid therewith, having the spiral springs 54 and 55 engaging the same upon opposite sides thereof. The springs 54 and 55 respectively engage at their opposite ends, the lugs 56 and 57, which are rigid on the ends of the rack 51. By this arrangement, the springs 54 and 55, under compression, normally maintain the rack 51, in such position, that the prism D exposes the panels 33 and 36 through the front and rear display openings respectively, of the casing or housing C.

The rack 51 may be actuated in electrical manner, as by providing spaced electromagnets 60 and 61 rigid upon the floor 16, at the ends of the guides 52. The electromagnets 60 and 61 respectively cooperate with the armature plates 62 and 63 respectively upon opposite ends of the racks 51. Referring to the diagrammatic representation in Figure 12, it is preferred that the electric energy be supplied from an exciter 65, such as the ordinary storage battery, one terminal of which may be grounded as at 66, and the other terminal of which may be directly connected to the switch structures 67 and 68, which are adapted for respective control of the armatures 60 and 61. If desired, a control switch 69 may be employed in the wires leading from the switches 67 and 68 to the electromagnets 60 and 61, which may be operated for cutting off communication of said switches 67 and 68 with their electromagnets.

Referring to operation of the arrangement D, it is apparent that when the switch 69 is closed, and the switch 67 is closed by the operator, the switch 68 remaining open, the electromagnet 60 will be energized so that the rack 51 will be moved, through attraction of armature plate 62 in the direction of the electromagnet 60. This movement of rack 51 will also swing the prism of mechanism D, until the panels 32 and 35 bearing the indicia "Left" are respectively exposed to the rear and forward openings 28 and 27 of the casing C, thus informing traffic rearwardly and forwardly of the vehicle, of a contemplated left hand turn of the vehicle. The operation of the prism member D to expose the panels 34 and 37 through the rear and front openings respectively of the casings C is effected by closing of the switch 68, which has the effect of energizing the electromagnet 61 for attraction of the armature 63 of the rack 51.

In some instances, it may be desirable to expose to view certain panels of the mechanism D, independently of the electromagnets 60 and 61, notwithstanding the tendency of the springs 54, and 55 to return the mechanism D to normal position herein before described. To provide for such operation, a lever 71 may be oscillatively connected for vertical swinging, as to a pin 72 carried by the rack 51. Its lever 71 may extend rearwardly through the inner wall 19 of the casing or housing C, and as the signal B is to be mounted upon the body of the vehicle A, it is preferred that the hand engaging end 73 of the lever 71 extend rearwardly through the body 74 of the vehicle B. Upstanding lugs 75 and 76 may be provided upon the lever 71, which are adapted for respective selective engagement with the surfaces 77 and 78 of the casing and vehicle body, in order to position the rack 51 so that the panels of the devices may be selectively positioned in secure manner for exposing desired signalling indicia. As is illustrated in Figure 7 of the drawings, the levers 71 may be oscillated so that the lugs 75 and 76 may act as stops as above mentioned.

Referring to the secondary mechanism F, the same principally includes panels 80 and 81 adapted for exposing certain indicia through the rear casing or housing opening 28. A substantially U-shaped guide channel 82 is mounted longitudinally within the housing compartment 26, upon the floor 16 thereof adjacent the rear wall 18, the same providing a groove 83, in which the panels 80 and 81 are slidably disposed. The panel 80 includes the opaque body portion 85, provided with upwardly extending grooved arms 86, which are adapted to receive a diaphanous plate 87, as a part of the panel 80. Both the opaque and diaphanous portions 85 and 87 are adapted to receive the signalling words "Back" 88 and 89 respectively. A cap 90 is preferably mounted over the upper end of the panel 80, which is provided with the spaced apertured lugs 91 receiving the end portion 92 of a relatively long reciprocating rod 93, which extends laterally through the housing C and vehicle body 74 and provided with a handle 95, whereby the panel arrangement 80 may be slid longitudinally in its guide groove 83, so that the same may be selectively exposed through the casing opening 28 for display purposes, or moved to the end of the groove 83 adjacent the casing wall 20, so that the same may not be seen. The panel 81 preferably includes an opaque body portion 97, which may be of metal and providing the upwardly extending arms 98, grooved to receive a diaphanous plate 99, similar to the plate 87 above mentioned. Both the opaque portion 97 and the diaphanous portion 99 are adapted to respectively receive the similar indicia "Stop" 100 and 101. A bottom member 102 is preferably provided, which receives the lower end of the panel arrangement 81 therein. This member 102 is provided with a pair of lugs 103 with aligning apertures therein, receiving the right angled end 104 of a rod 105. The rod 105, which is adapted for operating the panel device 81 within its guide groove 83, is preferably provided with an upstanding lug 107, which engages the inside surface 108 of a vehicle body plate 109, so that the panel 81 may be retained in a position for display purposes through the housing opening 28. In order to insure the return of the panel 81, to its position behind the rear wall 18, a contraction spiral spring 110 is preferably employed, which may be connected, as to a lug 111 on the member 102, the opposite end of the spring 110 being connected as to an adjustable staple 112 secured to a bracket member 113 within the casing C. It is thus obvious that in order to move the panel 81 in position for display through the opening 28, it is necessary to tension the spring 110, and for temporarily retaining the panel 81 displayed the lug 107 is provided, so that such display may be effected, without the necessity of the operator holding the rod 105 inwardly to tension said spring, as the rod may be merely oscillated so that the lug 107 engages the plate 109, as above mentioned.

In using the improved signal B in daytime, the direction indicating characters on the opaque portions of the various panels above mentioned, stand out the most prominent through the display plates 27ª and 28ª, as the same are moved for indicating purposes. However, it is preferred that an electric light 115 or analogous illuminating means be disposed within the compartment 116 provided by the prism of mechanism D, whereby the rays of the same when illuminated, are adapted for emanation through the various diaphanous and translucent portions of the panels. It is obvious that when the panels 80 and 81 are secreted behind the rear wall 18, the translucent and transparent portions 44 of the panels 32 to 37 inclusive may be moved so that the rays will emanate therethrough for placing the indicia thereon in relief for display purposes. It is also preferred that the translucent portions 87 and 99 be respectively tinted brown and red, so that the indicia 89 and 101 respectively thereon may stand in relief by emanation of the rays of light from lamp 115, when the panels 80 and 81 are moved into display arrangement with the casing opening 28.

Various changes may be made in the construction of the vehicle signal, such as rearrangement of panels and colors thereof. Any such changes, of course, together with others of like character, may be made to the form of invention herein shown and described, without departing from the spirit of this invention or the scope of the claims.

I claim:

1. A vehicle signal comprising a housing having front and rear sight openings, an indicia bearing mechanism rotatably mounted in the housing and including a prism having like indicia on diametrically opposite faces thereof, means for actuating said indicia bearing mechanism to selectively expose like indicia at said sight openings, indicia bearing panels, and means movably mounting said panels in the housing between the prism and the rear sight opening.

2. A vehicle signal comprising a housing having a sight opening, an indicia bearing mechanism rotatably mounted in the housing and including a translucent prism provided with indicia on the faces thereof to be selectively displayed for view thru the sight opening, a lamp in said prism, a translucent indicia bearing panel having indicia thereon, and means movably mounting said panel in said housing so that it may be moved to a position between the sight opening and prism to be illuminated by said lamp, and to a position concealed within the casing.

3. A vehicle signal comprising a housing provided with a display opening therein, a prism rotatably mounted within said housing, each of the sides of said prism providing panel arrangements having upper and lower portions, one being opaque and the other a diaphanous portion, each of said opaque and diaphanous portions of a panel including similar indicia pertinent to a contemplated vehicle movement, means for the selective positioning of the sides of said prism so that a particular panel side thereof may be exposed through said housing opening, and illuminating means within said prism adapted for emanation of rays through said diaphanous portions of said prism sides.

4. A vehicle signal comprising a housing provided with display openings oppositely disposed in opposite walls thereof, a prism member rotatably mounted within said housing intermediate the display openings therein, the sides of said prism member each having an upper translucent portion and a lower opaque portion, said sides adapted to contain indicia pertinent to various contemplated movements of a vehicle, each side adapted to have similar indicia on the opaque and diaphanous portions thereof, means for movement of said prism so that the sides of said prism member containing similar indicia will be exposed through said display openings, and illuminating means within said prisms for throwing the indicia on the diaphanous portions thereof into relief.

ROBERT A. CONNOR.